March 26, 1957 H. C. SIMMONS 2,786,314
SHARPENER FOR SLICING BANDS
Filed July 11, 1955 6 Sheets-Sheet 2

INVENTOR.
HARYL C. SIMMONS
BY Braddock and Braddock
ATTORNEYS

March 26, 1957 H. C. SIMMONS 2,786,314
SHARPENER FOR SLICING BANDS
Filed July 11, 1955 6 Sheets-Sheet 6

INVENTOR.
HARYL C. SIMMONS
BY
Braddock and Braddock
ATTORNEYS

United States Patent Office 2,786,314
Patented Mar. 26, 1957

2,786,314

SHARPENER FOR SLICING BANDS

Haryl C. Simmons, Anoka, Minn.

Application July 11, 1955, Serial No. 520,962

13 Claims. (Cl. 51—248)

This application is a continuation in part of my application Serial No. 420,230, for Sharpener for Slicing Bands, filed April 1, 1954, now abandoned.

The invention herein has relation to a device for sharpening slicing bands capable of employment for various purposes and especially useful for accomplishing the sharpening of slicing bands of bread slicing machines of a kind now of commerce.

An object of the invention is to provide a new and improved device which can be applied to slicing bands while being driven in a bread or other slicing machine to cause the slicing bands to be quickly and properly sharpened.

A further object is to provide a device of character to be assembled with a bread or other slicing machine as ordinary equipment thereof for adjustment to positions where capable of functioning to selectively sharpen each of a plurality of slicing bands in said machine while said bands are being propelled, as well as to position where clear of the bands when operative to accomplish bread or other slicing operations.

A further object is to provide a device which will incorporate mechanism adapted to be continuously operative upon a cutting edge of a slicing band as portions there of are progressively fed through or past the device to cause the full circumference of said cutting edge to be sharpened, and a construction and arrangement for constantly maintaining each portion of the slicing band in a single plane while in said device during the sharpening operation.

A further object is to provide in the sharpening device a construction and arrangement for wiping off each slicing band before, while and after it is sharpened, thus to insure that the bands will be clean upon resumption of slicing operations following sharpening operations.

A further object is to provide a sharpening device of the general character as set forth which can include a protecting housing for covering up grinders of the device while operative to sharpen slicing bands also covered up by the protecting housing.

Additional objects of the invention will become apparent as the description proceeds.

In the accompanying drawings forming a part of this specification.

Figures 1, 2:
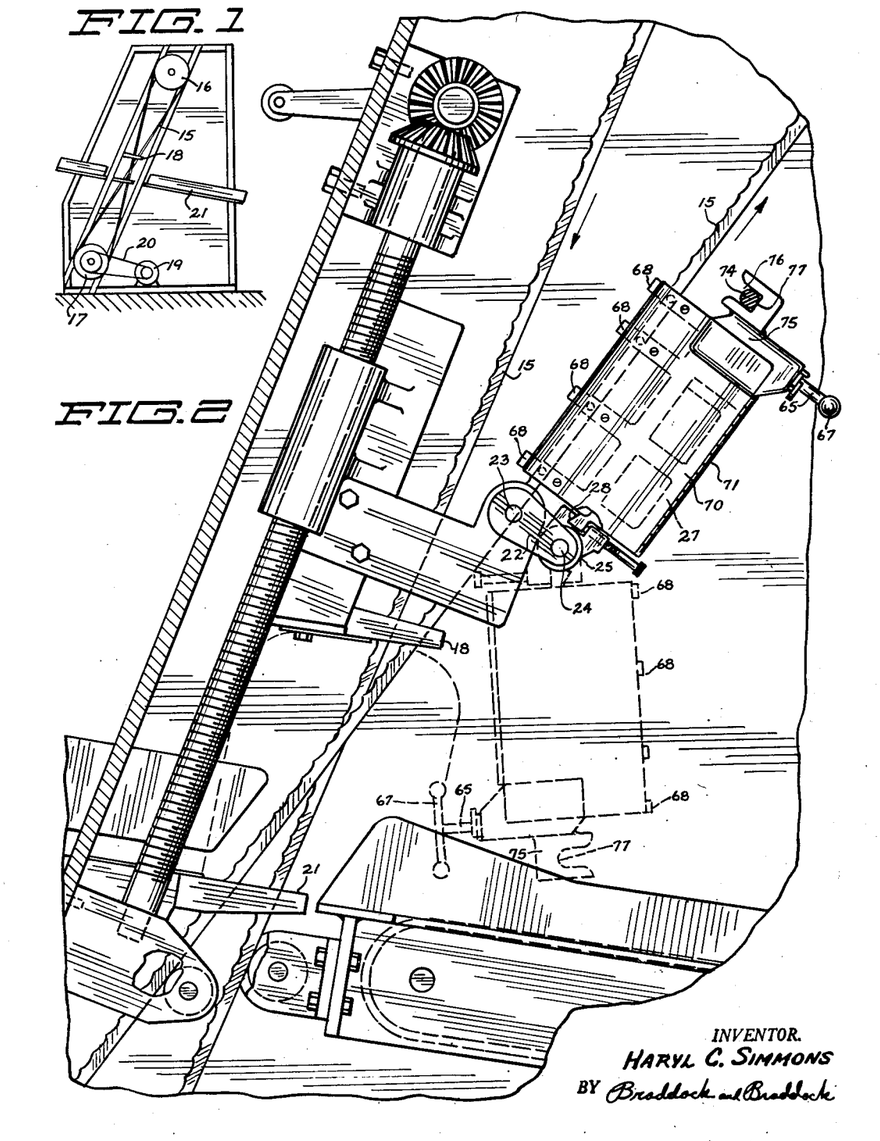
Fig. 1 is a side elevational view of a bread slicing machine of character as now commonly in use.
Fig. 2 is a side elevational view, on a scale larger than in Fig. 1, of a sharpener for slicing bands made according to the invention as when applied to use in a machine as disclosed in Fig. 1.

In Fig. 1 of the drawings there is disclosed a bread slicing machine of construction as now commonly in use, and in Fig. 2 a sharpening device incorporating the features and characteristics of the invention is shown as when assembled with a slicing machine as in said Fig. 1. The new and improved device is associated with said slicing machine in such manner that it can be employed to sharpen each of the slicing bands thereof. A single slicing band, denoted 15, is shown. Each slicing band is continuous, rides upon spaced upper and lower drums, indicated 16 and 17, respectively, of the machine, and the different slicing band lengths are retained in spaced, parallel relation, as by guide fingers 18, the spaces between adjacent lengths of slicing bands of course depending upon the thickness it is intended the slices of bread to have. Side surfaces of each slicing band ride the upper and lower drums 16 and 17, the slicing bands are twisted at locations adjacent said drums, lengths of each slicing band cross each other in spaced relation transversely of the slicing machine at location midway between the drums, and the cutting edge of each length of each slicing band faces upwardly at locations between said drums, as is plainly disclosed in Fig. 2 of the drawings. The lower drum 17 is driven by an electric motor 19 through the medium of a belt 20, and the slicing bands are taut. Loaves of bread to be sliced are advanced successively along a platform 21, clear of the sharpening device, thus to be fed to and past the slicing bands, and upon completion of their slicing the loaves are carried out of the machine.

Brackets 22, one being shown, each at an outer side of and in spaced relation to an outermost slicing band 15, are fixedly supported, as at 23, upon parts of the slicing machine and extend therefrom to position below the slicing bands. A shaft 24, for supporting the sharpening device, is mounted in lower end portions of the brackets 22 and extends transversely of the slicing machine at the under side of and in spaced relation to said slicing bands. The slicing bands are in a substantially vertical plane and the supporting shaft 24 is in a horizontal plane as herein illustrated and described.

A hub 25 is mounted, as at 26, upon the supporting shaft 24 for rotatable movement thereon and slidable movement therealong, and a frame of the sharpening device is constituted as an elongated member 27 having an end portion thereof rigidly secured, as at 28, to the hub 25. The construction and arrangement are such that the frame or elongated member 27 and the hub 25 are rotatable as a unit in a vertical plane upon said supporting shaft 24.

The frame or elongated member 27 is cut away to provide spaced apart, vertical openings, represented 29, 30 and 31, respectively, in said frame or elongated member which are in alined relation longitudinally thereof. The lower ends of the openings 29, 30, 31 are bounded or defined by a lower wall 32 of said frame or elongated member in perpendicular relation to the supporting shaft 24, and walls 33, between and at the opposite sides of the openings 29 and 30 and perpendicular to the lower wall 32, interconnect a main body of the frame or elongated member with said lower wall.

Each of the vertical openings 29 and 30 receives or contains a vertical tool holding lever, indicated 34 and 35, respectively, and the vertical opening 31 receives or contains a pair of vertical, complemental wiper holding levers, each designated 36. All of the tool holding levers 34, 35 and wiper holding levers 36, 36 are in alinement longitudinally of the frame or elongated member 27.

A horizontal shaft 37, beneath and in spaced, parallel relation to the main body of the frame or elongated member 27, as well as above and in spaced relation to the lower wall 32 and in perpendicular relation to the shaft 24 upon the slicing machine, is supported in the walls 33 and in turn supports said tool holding levers 34, 35 and wiper holding levers 36, 36.

Figure 5:
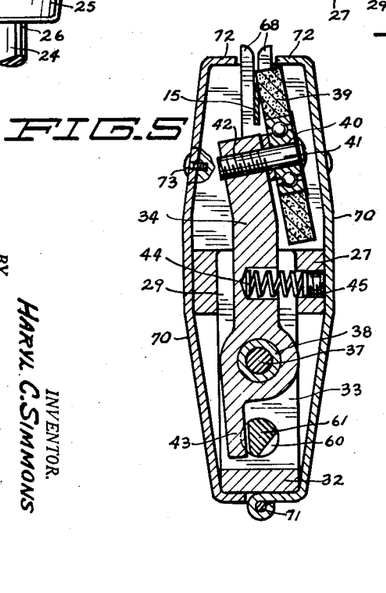
Fig. 5 is a detail sectional view, taken as on line 5—5 in Fig. 3.

The tool holding lever 34 has a lower portion thereof rotatably mounted, as at 38, upon the horizontal shaft 37, and an upper portion of said tool holding lever 34 extends upwardly above the main body of the frame or elongated member 27 generally toward a side thereof, the left side in Fig. 5, in the disclosure as made. A grinding wheel 39, situated at the side of the upper portion of the tool holding lever 34 opposite the side toward which said upper portion extends, as well as at a side of the elongated member 27, the right side in said Fig. 5, is rotatably mounted, as at 40, upon a pin 41 itself fixed, as at 42, in said tool holding lever 34. The construction and arrangement are such that the grinding wheel 39 is at a side of the slicing band, the right side in Fig. 5, in acute angle relation thereto when said slicing band is fed through or past the sharpening device in a manner hereinafter to be made plain. A lower portion 43 of the tool holding lever 34 projects downwardly from the horizontal shaft 37 at a side of the frame or elongated member 27, the left side in said Fig. 5. Horizontal compression coil springs 44 in the main body of said frame or elongated member at the side thereof opposite the lower portion 43, the right side in Fig. 5, normally urge the grinding wheel 39 toward the left in said Fig. 5. Stated differently, the compression coil springs 44 are for resiliently urging said grinding wheel 39 against the cutting edges of slicing bands while being operated upon in the sharpening device. Each compression coil spring 44 has one of its end portions situated in a concavity in the tool holding lever 34 and its opposite end portion situated in a concavity in the main body of the frame or elongated member 27. The ends of the compression coil springs 44 in said frame or elongated member are engaged against screws 45 capable of inward and outward adjustment to alter the power of said compression coil springs. Stated differently, resilient pressure under which it is desired that the grinding wheel 39 engage a slicing band while being sharpened in the device can be accurately controlled merely by adjustment of the screws 45.

Figure 6:
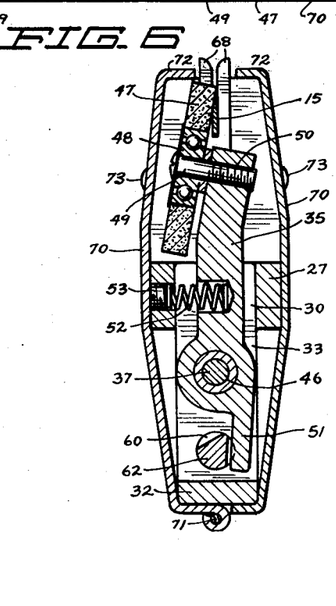
Fig. 6 is a detail sectional view, taken as on line 6—6 in Fig. 3.

The tool holding lever 35 has a lower portion thereof rotatably mounted, as at 46, upon the horizontal shaft 37, and an upper portion of said tool holding lever 35 extends upwardly above the main body of the frame or elongated member 27 generally toward the side thereof opposite the side toward which the upper portion of the tool holding lever 34 extends, the right side in Fig. 6. A grinding wheel 47, situated at the side of the upper portion of the tool holding lever 35 opposite the side toward which said upper portion extends, as well as at a side of the frame or elongated member 27, the left side in said Fig. 6, is rotatably mounted, as at 48, upon a pin 49 itself fixed, as at 50, in said tool holding lever 35. The construction and arrangement are such that the grinding wheel 47 is at the side of a slicing band opposite the grinding wheel 39, the left side in Fig. 6, in acute angle relation to said slicing band when fed through or past the sharpening device. The grinding wheels 39 and 47 are in planes parallel to the plane of the frame or elongated member 27. A lower portion 51 of the tool holding lever 35 projects downwardly from the horizontal shaft 37 at a side of said frame or elongated member, the right side in said Fig. 6. Horizontal compression coil springs 52 backed up by adjustable screws 53 function in the same general manner as described in connection with the compression coil springs 44 and adjustable screws 45. That is to say, the pressure under which the grinding wheel 47 can resiliently engage a slicing band while being sharpened can be accurately controlled by adjustment of the screws 53.

Figure 9:
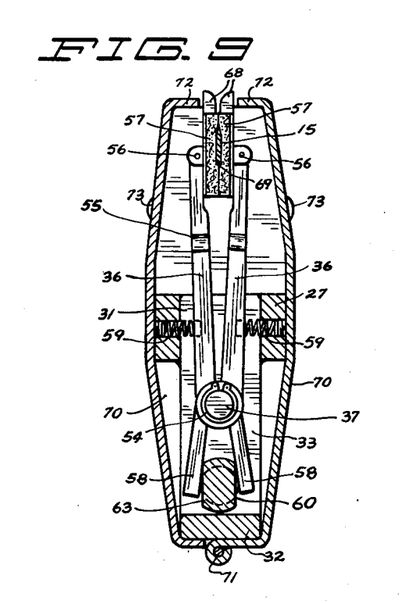
Fig. 9 is a detail sectional view, taken as on line 9—9 in Fig. 3.
Figure 10:
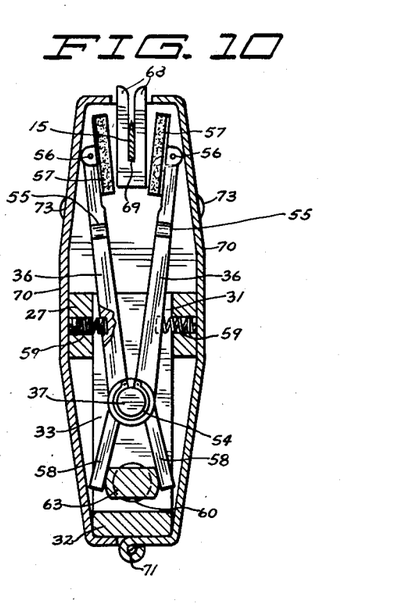
Fig. 10 is a view corresponding generally with the disclosure of Fig. 9 but showing parts in different positions.
Figure 11:
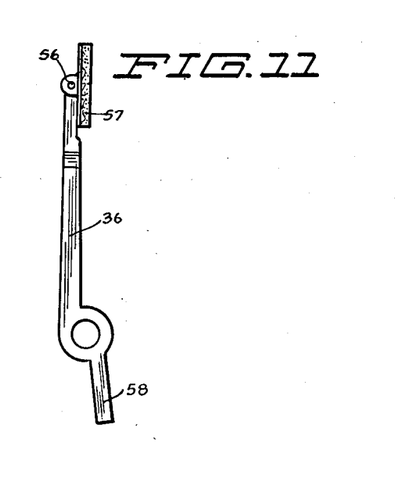
Fig. 11 is an edge elevational view of a wiper holding lever with wiping pad of the device.
Figures 12, 13:
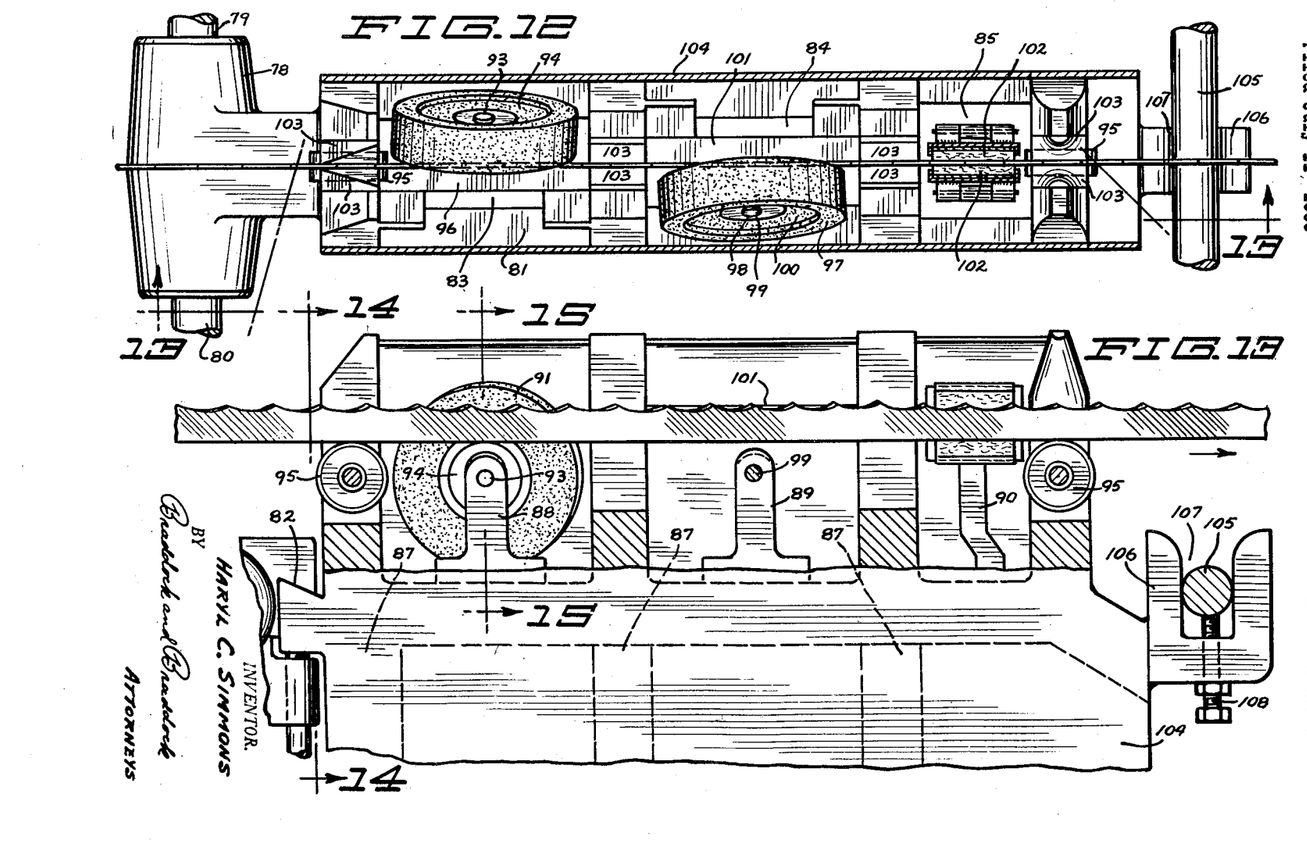
Fig. 12 is a top plan view of a sharpener of modified construction incorporating features and characteristics of the invention, showing a protecting housing for the sharpener in section.
Fig. 13 is a vertical longitudinal sectional view, taken on line 13—13 in Fig. 12.
Figure 14:
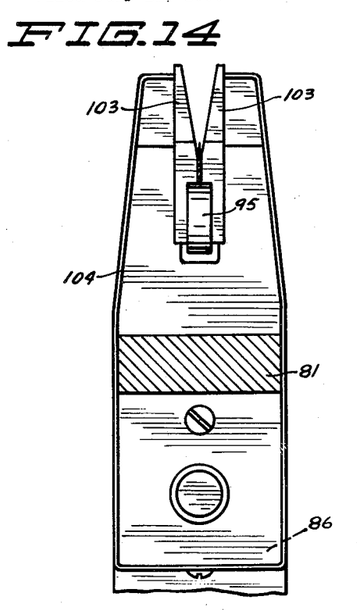
Fig. 14 is a detail sectional view taken as on line 14—14 in Fig. 13.
Figure 15:
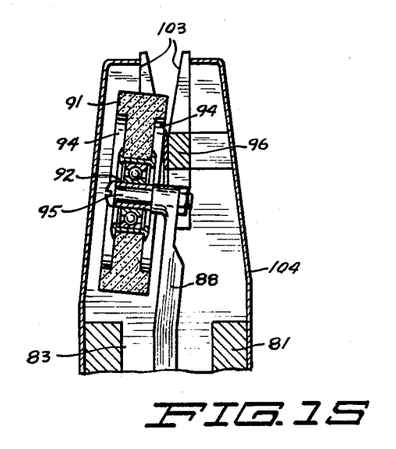
Fig. 15 is a detail sectional view, taken as on line 15—15 in Fig. 13.
Figure 16:
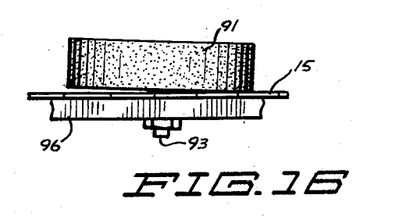
Fig. 16 is a fragmentary plan view of a grinding wheel and a back-up element of the sharpener disclosed in Figs. 12 to 15, inclusive.

Each of the wiper holding levers 36 has a lower portion thereof rotatably mounted, as at 54, upon the horizontal shaft 37, and an upper portion of each wiper holding lever extends upwardly above the main body of the frame or elongated member 27. Parts of the wiper holding levers 36, 36 which are at the elevation of the horizontal shaft 37 are in parallel, adjacent relation and alined longitudinally of the frame or elongated member 27. Each wiper holding lever 36 is twisted, as at 55, at a location above the main body of said frame or elongated member of the sharpening device, and upper end portions of the wiper holding levers, respectively, are in alinement transversely of the frame or elongated member, as well as situated adjacent opposite sides of said frame or elongated member. The upper end of each wiper holding lever 36 suitably and conveniently pivotally supports, as at 56, a wiping pad 57, which desirably can be of felt. The wiping pad upon one of the wiper holding levers 36 will be at one side and the wiping pad upon the other wiper holding lever will be at the opposite side of a slicing band while it is passing through the device and being sharpened. A lower portion 58 of each wiper holding lever 36 projects downwardly from the horizontal shaft 37, the lower portion of the wiper holding lever supporting the wiping pad 57 at the right in Figs. 9 and 10 being at the left, and the lower portion of the wiper holding lever supporting the wiping pad 57 at the left in said Figs. 9 and 10 being at the right. Horizontal compression coil springs 59 in the main body of the frame or elongated member 27 normally urge the wiping pads 57, 57 toward each other, and said wiping pads are in a plane parallel to the plane of said frame or elongated member and also including the grinding wheels 39 and 47. The wiping pads 57 are situated at opposite sides of and in equally spaced relation to a plane passed centrally and longitudinally and vertically through the frame or elongated member 27, as are also the grinding wheels 39 and 47.

Figures 3, 4:
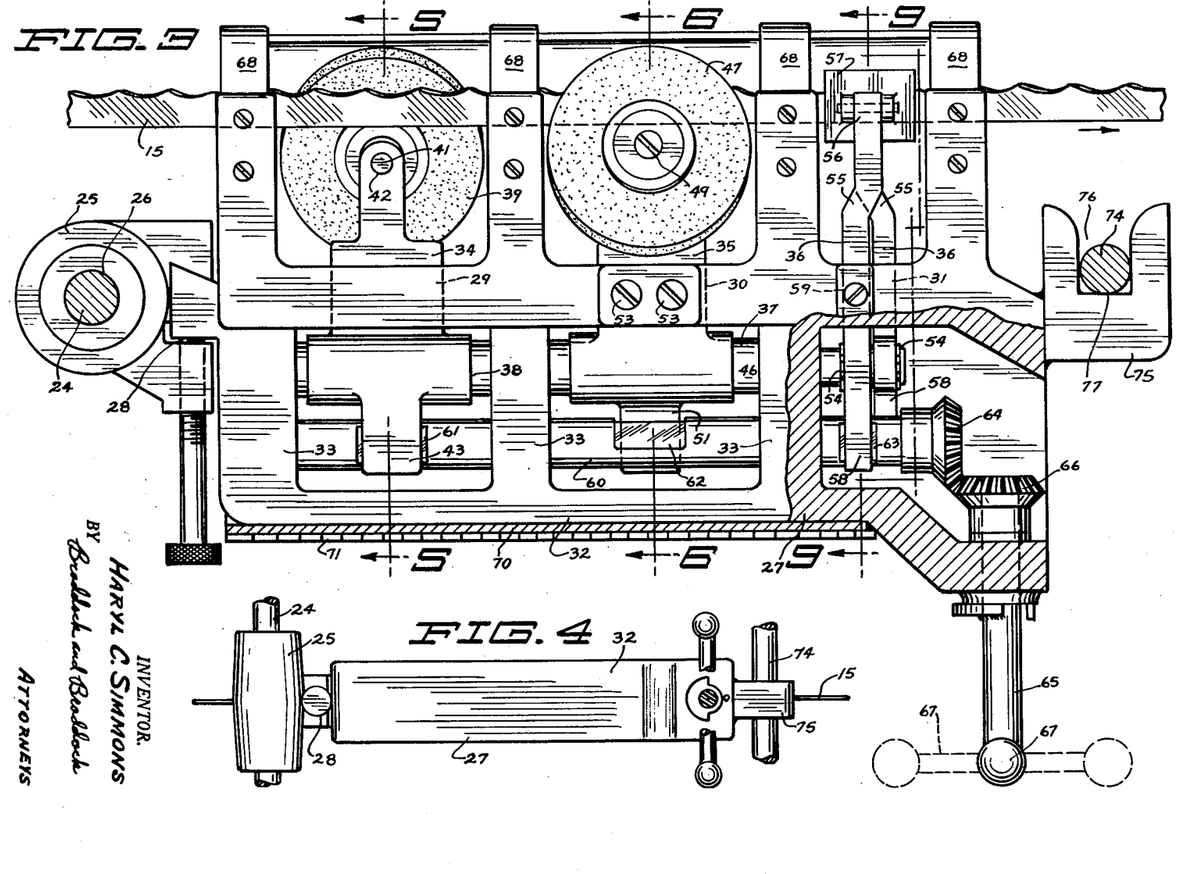
Fig. 3 is a side elevational view, on a still larger scale, of the sharpener of Fig. 2, portions of said sharpener being broken away and in section.
Fig. 4 is a bottom plan view, partially in section and partially broken away, on a reduced scale, of the sharpener as it would appear with the protecting housing removed.
Figure 7:
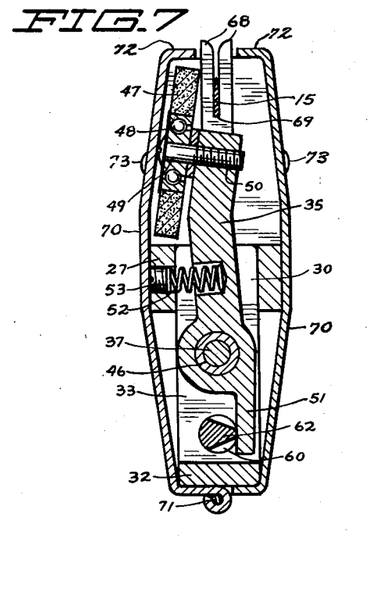
Fig. 7 is a view corresponding generally with the disclosure of Fig. 6 but showing parts in different positions.

A horizontal cam shaft 60, rotatably mounted in the walls 33 of the frame or elongated member which interconnect the main body of said frame or elongated member with the lower wall 32 thereof, is situated in spaced, parallel relation to both the horizontal shaft 37 and said lower wall. A first cam 61 upon the horizontal cam shaft 60 is situated adjacent to and in alinement transversely of said frame or elongated member with the lower portion 43 of the tool holding lever 34, about as disclosed in Fig. 5. A second cam 62 upon said horizontal cam shaft is situated adjacent to and in alinement transversely of the elongated frame or elongated member with the lower portion 51 of the tool holding lever 35, as disclosed in Figs. 6 and 7. And a third cam 63 upon the horizontal cam shaft is situated between and adjacent to and in transverse alinement with the lower portions 58, 58 of the wiper holding levers 36, 36, about as disclosed in Figs. 9 and 10. Also, see Fig. 3.

Figure 8:
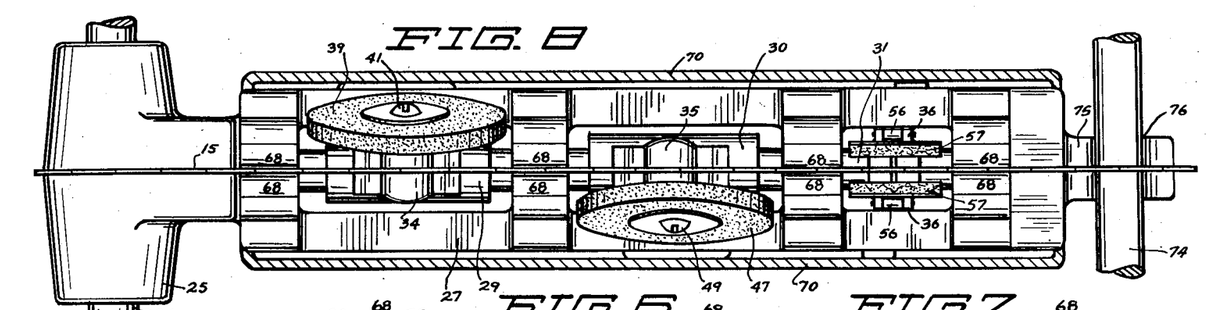
Fig. 8 is a top plan view of the sharpener disclosing the protecting housing in section.

An extension upon the end of the horizontal cam shaft 60 spaced from the supporting shaft 24 rigidly supports a first bevel gear 64 in alinement with said horizontal cam shaft, and an extension upon the lower wall 32 of the frame or elongated member 27 rotatably supports, against the possibility of endwise movement, an actuator shaft 65 disposed in perpendicular relation to the horizontal cam shaft and having thereon and in alinement therewith a second bevel gear 66 which meshes with said first bevel gear 64. A manipulating handle 67 rigid with a free end portion of the actuator shaft 65 spaced from the first and second bevel gears 64 and 66 is for accomplishing manual rotation of the horizontal cam shaft 60, together with its first, second and third cams as a unit. The construction and arrangement will be such that the manipulating handle 67 can be situated transversely of the frame or elongated member 27, as in Figs. 2, 3 and 4, to cause the cams 61, 62 and 63, respectively, to be situated as in Figs. 5, 6 and 9, thus to release the lower portions of the tool and wiper holding levers and permit the compression coil springs to resiliently urge the grinding wheel and the wiping pads against a slicing band while sharpened, or situated longitudinally of said frame or elongated member, as in dotted lines in Figs. 2 and 3, to cause the cams 61, 62 and 63, respectively, to be situated as in Figs. 7 and 10, thus to cause said lower portions of the tool and wiper holding levers and the grinding wheels and wiping pads to be spread and held apart against resilient force of said compression coil springs. See Fig. 8.

The sharpening device includes four longitudinally alined sets of guide fingers, each denoted 68, there being a first set of upstanding guide fingers between the hub 25 and the grinding wheel 39 in adjacent relation to said grinding wheel, a second set of upstanding guide fingers between the grinding wheels 39 and 47 in adjacent relation to each of said grinding wheels, a third set of upstanding guide fingers between said grinding wheel 47 and the wiping pads 57 in adjacent relation to both, and a fourth set of upstanding guide fingers at the side of said wiping pads opposite the grinding wheel 47 and in adjacent relation to the wiping pads. The guide fingers 68 of each set are in alinement transversely of the frame or elongated member 27, and in snug relation to a slicing band when passing through the device in the process of being sharpened, about as disclosed in the drawings. Lower, inner portions of the guide fingers 68 of each set are in contiguous relation so that, together, said guide fingers provide supporting surfaces, each indicated 69, all in a single plane parallel with the line of feed of slicing bands, upon and over which straight lower edges of the slicing bands ride as they are made to travel past or through the sharpening device. Desirably, the guide fingers, the grinding wheels and the wiping pads will be replaceable. And, too, either side of either grinding wheel can be employed to accomplish sharpening operations upon slicing bands. That is, the grinding wheels are reversible. The longitudinally alined sets of guide fingers provide a straight line of feed for slicing bands between and in equally spaced relation to the grinding wheels 39, 47 and the wiping pads 57, 57, respectively.

As disclosed, the sharpening device includes a protecting housing for covering up the grinding wheels, the wiping pads and slicing bands while being operated upon in said device. Said protecting housing is constituted as a pair of right and left housing elements, each indicated 70, hingedly connected, as at 71, along the longitudinal center of the outer surface of the lower wall 32 of the frame or elongated member 27, extending upwardly at the opposite sides of said frame or elongated member to a position above the grinding wheels and wiping pads and having interiorly extending flanges 72, 72 at the general location of the upper ends of the guide fingers 68. Intermediate parts of the right and left housing elements are detachably secured to upper portions of the frame or elongated member 27, as by screw bolts 73. The protecting housing encloses portions of slicing bands while being operated upon thus to insure the safety of an operator of the sharpening device, and, at the same time, said protecting housing offers no interference whatsoever to placement of said device into and removal of the device from operative sharpening position, or to the ready accomplishment of slicing band sharpening operations.

A locating bar for the sharpening device, represented 74, is constituted as a horizontal cylindrical rod rigid with and extending transversely across the slicing machine at a location below and in spaced relation to the slicing bands, as well as in parallel relation to the supporting shaft 24. An extension 75 upon the end of the frame or elongated member 27 opposite or spaced from said supporting shaft provides a groove 76 which faces in direction toward the grinding wheels and wiping pads and away from the manipulating handle 67. The groove 76 is of dimension to receive the locating bar or cylindrical rod 74 and is bounded at its inner end by a seat 77. The sharpening device is mounted upon the supporting shaft 24 to be capable of being slid longitudinally therealong as well as swung between the dotted line position in Fig. 2, where said device is clear of the slicing bands, and the full line position in said Fig. 2, where the device is situated to be operative upon the slicing band disclosed. An operator of the sharpening device has only to rotate it from inoperative position to position where the seat 77 is engaged against the locating bar or cylindrical rod 74 to situate or set the operating elements of said device in proper position to accomplish their intended service or function.

The slicing machine disclosed in Fig. 2 of the drawings includes a mechanism, not necessary to be described, for adjusting guide fingers 18 in said machine along the line of travel of the slicing bands. As shown, the brackets 22 are rigid with adjustable parts of said slicing machine which also rigidly support guide fingers 18. Suffice it to say that after completion of a bread slicing operation and before commencement of slicing band operations, the brackets 22, if not then properly situated to cause the seat 77 to engage the locating bar or cylindrical rod 74 with rotation of the device from the dotted line position to the full line position as in Fig. 2, will be so situated before said device is swung to its operative position. Stated differently, the brackets 22 are required to be in a set position upon the slicing machine in order that the locating bar or cylindrical rod will enter the groove 76 and the seat 77 will become engaged up against said locating bar or cylindrical rod when the sharpening device is swung to its operative position.

The sharpening device will be situated as in dotted lines in Fig. 2 of the drawings when the slicing machine is operative to slice bread or other material, at a side of and in adjacent relation to an outermost slicing band, clear of slicing operations. When the sharpening device is to be put to use, it will be swung from dotted line position to full line position as in said Fig. 2 to cause a slicing band to be situated between the guide fingers of each of the four sets of guide fingers, as well as between the grinding wheels 39, 47 and the wiping pads 57, 57. The manipulating handle 67 is shown in dotted lines in Figs. 2 and 3 situated as when the grinding wheels and the wiping pads are in spaced relation to the slicing band, as in Figs. 7, 8 and 10. Said manipulating handle will be turned from position as in dotted lines in said Figs. 2 and 3 to position as in full lines in Figs. 2, 3 and 4 after the sharpening device is situated in operating position thus to permit the compression coil springs to resiliently urge the grinding wheels and wiping pads into engagement with opposite surfaces of the slicing band, as in Figs. 3, 5, 6 and 9. During the sharpening operation, the seat 77 will be held up against the locating bar or cylindrical rod 74. That is, the handle 67 will be employed to rotate the sharpening device from position as in dotted lines to position as in full lines in Fig. 2, then the handle itself will be rotated from position as in dotted lines to position as in full lines in said Fig. 2, and said handle will be employed to manually retain the seat 77 up against the bar or rod 74 while each slicing band is being sharpened. Upon completion of a sharpening operation upon a slicing band, the handle 67 will be turned from position as in full lines to position as in dotted lines in Fig. 2, and the sharpening device will then be rotated from its full line position to or toward its dotted line position in said Fig. 2.

It will be evident that the device can be employed to sharpen each of the different slicing bands of a slicing machine as herein disclosed, merely by first sliding the hub 25 together with the frame or elongated member 27 as a unit along the supporting shaft 24 until the guide fingers 68 are alinged with a slicing band selected to be sharpened and then swinging said device to and retaining it in operative position while the sharpening operation is being accomplished.

Obviously, the longitudinally alined sets of guide fingers 68 will maintain portions of each slicing band sharpened in the device in a single plane while the portions are being continuously fed between and past and progressively operated upon the grinding wheels and wiping pads. Said grinding wheels of course will be initially set to have relation to cutting edges of slicing bands to be operated upon most suitable to the production of the maximum in sharpening results.

Slicing bands such as 15 are fed quite rapidly through slicing machines in which they are employed. The third cam 63, controlling the wiping pads 57, will be set to permit the compression coil springs 59, 59 to move said wiping pads against a slicing band to be sharpened in advance of movement of the grinding wheels 39 and 47 into engaged relation with the sliding band when the handle 67 is rotated from its dotted line to its full line position as in Fig. 3. And the first and second cams 61 and 62, controlling the grinding wheels 39 and 47, respectively, will be set to remove said grinding wheels from a slicing band before the wiping pads are removed from the slicing band when said handle 67 is rotated from its full line to its dotted line position as in said Fig. 3. Thus, each slicing band operated on in the device will be engaged by the wiping pads both before sharpening is commenced and after sharpening is completed, as well as continuously engaged by said wiping pads during the whole of the sharpening operation. In short, the slicing bands will be wiped off before, while and after being sharpened, whereby to make certain that they will be clean upon resumption of slicing operations following sharpening operations.

Figs. 12 to 16, inclusive, disclose a sharpening device of modified construction made according to the invention.

A hub 78 is mounted, as at 79, upon a supporting shaft 80, equivalent to the supporting shaft 24, for rotatable movement thereon and slidable movement therealong, and a frame 81 of the sharpening device of Figs. 12 to 16 is constituted as an elongated member, equivalent to the elongated member 27, having an end portion thereof rigidly secured, as at 82, to the hub 78. The frame or elongated member 81 and the hub 78 are rotatable as a unit in a vertical plane upon the supporting shaft 80.

The frame or elongated member 81 is cut away to provide spaced apart, vertical openings, indicated 83, 84 and 85, respectively, equivalent to the vertical openings 29, 30 and 31, which are in alined relation longitudinally of said frame or elongated member. The lower ends of the openings 83, 84, 85 are bounded or defined by a lower wall 86 of said frame or elongated member in perpendicular relation to the supporting shaft 80, and walls 87, between and at opposite sides of the openings 83 and 84 and perpendicular to the wall 86 interconnect a main body of the frame or elongated member with said lower wall 86.

Each of the vertical openings 83 and 84 receives or contains a vertical tool holding lever, indicated 88 and 89, respectively, and the vertical opening 85 receives or contains a pair of vertical, complemental wiper holding levers, each denoted 90. All of the tool holding levers 88, 89 and wiper holding levers 90, 90 are in alinement longitudinally of the frame or elongated member 81.

The tool holding levers 88, 89 and wiper holding levers 90, 90 are supported and operated in the same manner as are the tool holding levers 34, 35 and wiper holding levers 36, 36.

An upper portion of the tool holding lever 88 extends upwardly above the main body of the frame or elongated member 81 generally toward a side thereof. A grinding wheel 91, at the side of the upper portion of said tool holding lever opposite the side toward which said upper portion extends, is rotatably mounted, as at 92, upon a pin 93 fixed in the tool holding lever 88. The grinding wheel 91 is at a side of the slicing band, the left side in Fig. 15, in acute angle relation thereto when said slicing band is fed through or past the sharpening device in the manner as hereinbefore set forth. The grinding wheel 91 is centrally recessed or cupped, as at 94, and is set at an oblique angle, as more clearly disclosed in Fig. 16, to the line of feed of slicing bands to be sharpened. The construction and arrangement are such that a forward portion only of said grinding wheel, at the right side of the pin 93 in Figs. 12 and 16, engages the slicing bands while moving downwardly, toward the frame or elongated member 81. Stated otherwise, grinding always is accomplished in direction toward supporting means, constituted as spaced rollers 95, 95, for the slicing bands. The frame or elongated member 81 suitably and conveniently supports a back-up strip 96 at the side of the path of travel of slicing bands to be sharpened which is opposite the grinding wheel 91. As will be clear from Figs. 12 and 15 of the drawing, the back-up strip 96 is disposed longitudinally of the frame or elongated member 81 at the elevation of slicing bands to be operated upon, and during sharpening operations, a surface of each slicing band opposite said grinding wheel is retained in engaged relation with an adjacent surface of said back-up strip.

An upper portion of the tool holding lever 89 extends upwardly above the main body of the frame or elongated member 81 generally toward the side thereof opposite the side toward which the upper portion of the tool holding lever 88 extends. A grinding wheel 97, at the side of the upper portion of the tool holding lever 89 opposite the side toward which said upper portion extends, is rotatably mounted, as at 98, upon a pin 99 fixed in the tool holding lever 89. The grinding wheel 97 is at the side of the slicing band opposite the grinding wheel 91 in acute angle relation to said slicing band. The grinding wheels 91 and 97 are in planes parallel to the plane of the frame or elongated member 81. The grinding wheel 97 is centrally recessed or cupped, as at 100, and is set at an oblique angle to the line of feed of slicing bands to be sharpened, the same as is the grinding wheel 91. A forward portion only of said grinding wheel 97, at the right of the pin 99 in Figs. 12 and 13, engages slicing bands to be sharpened so that grinding is accomplished in downward direction toward the spaced supporting rollers 95, 95. The frame or elongated member 81 supports a back-up strip 101 at the side of the path of travel of slicing bands to be sharpened which is opposite the grinding wheel 97. The back-up strip 101 is disposed longitudinally of the frame or elongated member 81 at the elevation of the slicing bands, and a surface of each slicing band while being sharpened is retained in engaged relation with an adjacent surface of said back-up strip 101 in the same general manner as a surface of each slicing band is engaged with an adjacent surface of the back-up strip 96.

An upper portion of each wiper holding lever 90 extends upwardly above the main body of the frame or elongated member 81. The upper end of each wiper holding lever 90 supports a wiping pad 102. The wiping pads 102 are supported and function in the general manner as hereinbefore set forth in connection with the wiping pads 57.

The sharpening device of Figs. 12 to 16 includes four longitudinally alined sets of upstanding guide fingers, each denoted 103, between the hub 78 and the grinding wheel 91, between the grinding wheels 91 and 97, between said grinding wheel 97 and the wiping pads 102 and at the side of said wiping pads opposite the grinding wheel 97. The different sets of guide fingers 103 and the guide fingers of each set are related to the frame or elongated member 81 and to each other in the same manner as the different sets of guide fingers 68 and the guide fingers of each set are related to the frame or elongated member 27, and the guide fingers 103 perform the same service or function as do the guide fingers 68. One of the rollers 95 is supported for rotative movement upon the frame or elongated member 81 directly below the guide fingers of the set situated between the hub 78 and the grinding wheel 91, and the other roller 95 is supported for rotative movement upon said frame or elongated member directly below the guide fingers of the set situated at the side of the wiping pads 102 opposite the grinding wheel 97 in the vertical plane of slicing bands to be sharpened. The spaced rollers 95, 95 provide supporting surfaces in a plane parallel with the line of feed of slicing bands to be sharpened upon and over which straight lower edges of the slicing bands ride as they are made to travel past or through the sharpening device. The longitudinally alined sets of guide fingers 103 and the rollers 95 together provide a straight line of feed for slicing bands between and in equally spaced relation to the grinding wheels 91, 97 and the wiping pads 102, 102, respectively.

The sharpening device of Figs. 12 to 16 may include a protecting housing, represented at 104, which can be of the same construction as the protecting housing for the sharpening device of Figs. 1 to 11, hereinbefore described.

A locating bar 105 for the sharpening device of Figs. 12 to 16 is constituted as a horizontal cylindrical rod rigid with and extending transversely across the slicing machine at a location below and in spaced relation to the slicing bands, as well as in parallel relation to the supporting shaft 80. An extension 106 upon the end of the frame or elongated member 81 opposite or spaced from said supporting shaft 80 provides a groove 107 which faces toward the grinding wheels and wiping pads. The groove 107 is of dimension to receive the locating bar or cylindrical rod 105. An adjusting screw 108 in the extension 106 at the lower or inner side of the groove 107 includes an inner end to be seated against an adjacent surface of the locating bar or rod 105 in the manner as disclosed in Fig. 13. The sharpening device of Figs. 12 to 16 is mounted upon the shaft 80 to be slidable therealong, as well as swung between a position where said device is clear of slicing bands and a position, as in Figs. 12 and 13, where the device is situated to be operative upon slicing bands. An operator has only to adjust the screw 108 to appropriate position and rotate the sharpening device from inoperative position to position where the inner end of said screw 108 is engaged against the locating bar or rod 105 to situate or set the operating elements of the device in proper position to be operative efficiently in the accomplishment of their intended service or function.

The sharpening device of Figs. 12 to 16 will be manipulable and operable when applied to use in the same general manner as is the sharpening device of Figs. 1 to 11.

During sharpening operations, the screw 108 will be retained against the locating bar or rod 105. It is essential that said adjusting screw be accurately set if efficient sharpening is to be accomplished. The setting must be such that both of the grinding wheels 91 and 97 properly engage a slicing band to be sharpened, and so that both grinding wheels commence to rotate immediately when the adjusting screw becomes engaged with the locating rod or bar. Otherwise, a slicing band to be sharpened may be rested upon only one or the other of the rollers 95, and not upon both. Proper sharpening will be accomplished when the screw 108 is adjusted to position where each slicing band being sharpened rests squarely upon both of the spaced rollers 95.

What is claimed is:

1. The combination with a pair of spaced-apart drums, means for rotating one of said drums, a normally twisted continuous slicing band traveling over and between said drums, and said slicing band having a cutting edge, of: a device for sharpening said cutting edge of said continuous slicing band comprising a sharpening tool, a guide member, a frame supporting said sharpening tool and said guide member for movement toward and away from said slicing band in a plane parallel to the longitudinal axis of said band, said guide member including a pair of parallel, adjacent, spaced apart guide fingers adapted to receive said band therebetween as said guide member and said sharpening tool are moved toward said band, means for positioning and maintaining said band in a single plane passing through the longitudinal axis of said band at a first location between said drums, said guide fingers of said guide member together being adapted to receive said band therebetween as said guide member and said sharpening tool are moved in direction toward said band to position and maintain said band in said single plane at a second location between said drums and to position said sharpening tool in adjacent relationship to said band between said first and second locations, and means for urging said sharpening tool into engagement with an adjacent surface of the cutting edge of said slicing band when said band has been received between said guide fingers of said guide member.

2. The combination with a base, first and second spaced-apart drums rotatably mounted on said base, means for rotating one of said drums and a continuous normally twisted slicing band traveling over and between said spaced apart drums, said slicing band having a cutting edge, of: a device for sharpening said cutting edge comprising a sharpening tool, a guide member, a frame supporting said sharpening tool and said guide member for movement toward and away from said slicing band in a plane parallel to the longitudinal axis of said band and for movement perpendicular to a side surface of said band, said guide member including a pair of parallel, adjacent, spaced apart guide fingers adapted to receive said band therebetween as said guide member and said sharpening tool are moved toward said band, means for positioning and maintaining said band in a single plane passing through the longitudinal axis of said band at a first location between said drums, said guide fingers of said guide member together being adapted to receive said band therebetween as said guide member and said sharpening tool are moved in direction toward said band to position and maintain said band in said single plane at a second location between said drums and to position said sharpening tool in adjacent relationship to said band between said first and second locations, and means for urging said sharpening tool into engagement with an adjacent surface of the cutting edge of said slicing band when said band has been received between said guide fingers of said guide member.

3. The combination with a base, first and second parallel, spaced-apart drums rotatably mounted on said base, means for rotating one of said drums, and a continuous slicing band turning on and being fed between said first and second drums, said slicing band having a cutting edge, of: a device for sharpening said cutting edge of said continuous slicing band comprising a sharpening tool, a guide member, a frame supporting said sharpening tool and said guide member for movement toward and away from said slicing band in a plane parallel to the longitudinal axis of said band, said guide member including a pair of adjacent guide fingers, said guide fingers having parallel, spaced apart, inner body portions, means for positioning and maintaining said band in a single plane passing through the longitudinal axis of said band at a first location between said drums, said guide fingers together being adapted to receive said band therebetween as said guide member and said sharpening tool are moved in direction toward said band to position and maintain said band in said single plane at a second location along said band and to position said sharpening tool in adjacent relationship to said band between said first and second locations, and means for urging said sharpening tool into engagement with an adjacent surface of the cutting edge of said slicing band when said band has been received between said inner body portions of said guide fingers.

4. The combination with a base, first and second parallel, spaced-apart drums rotatably mounted on said base, means for rotating said drums in opposite directions, and a continuous slicing band turning on and being fed between said first and second drums, said slicing band having a cutting edge and said band having first and second portions thereof each extending from a position in contact with and tangent to said first drum to position in contact with and tangent to said second drum, and each of said band portions having a twist of 180 degrees therein, of: a device for sharpening said cutting edge of said continuous slicing band comprising a frame pivotally mounted with respect to said base for movement in a plane perpendicular to the axes of said drums, a sharpening tool and a guide member each mounted on said frame, said frame being movable away from and toward said first portion of said slicing band to alternatively locate said sharpening tool in a first position clear of said band and in a second position adjacent the first portion of said band, said guide member being provided with a guide slot, a portion of said guide slot lying in a plane perpendicular to the axes of said drums, said guide slot being of configuration to straighten the normally twisted band as said sharpening tool and guide member are moved toward said slicing band and to position a part of said first portion of said band in said slot in a plane perpendicular to the axes of said drums when said sharpening tool is in said second position, and means for urging said sharpening tool into sharpening engagement with said cutting edge of said slicing band when said sharpening tool is in said second position.

5. The combination with a base, first and second, parallel, spaced-apart drums rotatably mounted on said base, means for rotating said drums in opposite directions, and a continuous slicing band turning on and being fed between said first and second drums, said slicing band having a cutting edge and said band having first and second portions thereof each extending from position in contact with and tangent to said first drum to position in contact with and tangent to said second drum, and each of said first and second band portions having a twist of 180 degrees therein, of: a device for shapening said cutting edge of said continuous slicing band comprising a frame mounted on said base to have pivotal movement in a plane perpendicular to the axes of said drums and sliding movement in a direction parallel to said drum axes, a pair of guide members mounted on said frame, and a sharpening tool mounted on said frame between said guide members, said frame being movable away from and toward said first portion of said slicing band to alternatively locate said sharpening tool in a first position clear of said band and in a second position adjacent the first portion of said band, each of said guide members being provided with a guide slot, a first portion of each of said guide slots lying in a common plane perpendicular to the axes of said drums, a second portion of each of said guide slots at an end of said guide member being of tapered construction and open to said first normally twisted portion of said slicing band to straighten said normally twisted band when said sharpening tool and said guide members are moved toward said slicing band and to guide said band into said first portion of said slot, said guide members being so positioned that a part of said first portion of said band will be situated in each of said first portions of said guide slots when said sharpening tool is in said second position, and means for urging said sharpening tool into sharpening engagement with said cutting edge of said slicing band when said sharpening tool is in said second position.

6. The combination with a base, first and second parallel, spaced-apart drums rotatably mounted on said base, and a continuous slicing band turning on and being fed between said first and second drums, said slicing band having a cutting edge and said slicing band having first and second portions thereof each extending from position in contact with and tangent to said first drum to position in contact with and tangent to said second drum, and each of said first and second band portions having a twist of 180 degrees therein, of: a device for sharpening said cuttings edge of said continuous slicing band comprising first and second spaced apart guide means each in contact with a part of said first portion of said slicing band to tend to hold the section of said first portion of said slicing band between said guide means in a common plane, a sharpening tool mounted between said first and second guide means, and means for urging said sharpening tool into sharpening engagement with said cutting edge of said slicing band.

7. The combination with a base, first and second parallel, spaced apart drums rotatably mounted on said base, means for rotating one of said drums, and a continuous slicing band turning on and being fed between said drums, said slicing band having a cutting edge, of: a device for sharpening said cutting edge of said continuous slicing band comprising a frame mounted on said base to have pivotal movement in a plane perpendicular to the axes of said drums and to have sliding movement in the direction of said drum axes, a pivot shaft extending longitudinally of said frame, at least two tool holding arms pivotally mounted on said pivot shaft, a separate sharpening tool mounted on an end of each of said tool holding arms spaced from said pivot shaft, a plurality of guide members all having guide slots therein, each of said guide slots having a first portion thereof lying in a common plane passing through the first portion of all of the other guide slots, said plane being perpendicular to the axes of said drums, said frame being movable from a first position clear of said continuous slicing band to a second position where as part of said first portion of said band will lie within said first portion of each of said guide slots of said guide members and at least one of said sharpening tools will be in adjacent relationship to each side of said sharpening band, sharpening tool spring means normally urging each of said sharpening tools in direction to have sharpening relationship to said cutting edge of said continuous slicing band, a manipulating handle mounted in said frame, a tool cam operably associated with said manipulating handle and each of said tool holding arms to force the tool holding arms to move said sharpening tools in direction away from said cutting edge of said continuous slicing band against the action of said sharpening tool spring means when said manipulating handle is moved in a first direction and to release the tool holding arms to the action of said tool spring means when said manipulating handle is rotated in a second direction.

8. The combination as specified in claim 7 and a dust tight cover mounted on and encompassing said device, said cover being provided with an opening therein to allow reception of said continuous slicing band into said guide members and between said sharpening tools.

9. The combination as specified in claim 7, a pair of wiper holder arms pivotally mounted on said pivot shaft, a pair of wipers on said arms, a wiper cam operably associated with said manipulating handle and said wiper holding arms, wiper spring means normally urging each of said wipers into cleaning contact with an opposite side of said continuous slicing band when said frame is in position to have said continuous slicing band in said guide members, the relationship of said wiper cam with respect to said tool cam being such that the movement of said manipulating handle in said second direction will cause the wiper cams to release the wiper holding arms to the action of said wiper spring means before the tool holding arms are released to action of the sharpening tool spring means and the movement of the manipulating handle in said first direction will cause the tool cams to rotate the sharpening tools away from the continuous slicing band before the wipers are moved away therefrom.

10. The combination with a base, first and second parallel, spaced-apart drums rotatably mounted on said base, means for rotating said drums in opposite directions, and a continuous slicing band turning on and being fed between said first and second drums, said slicing band having a cutting edge and said slicing band having first and second portions thereof each extending from a position in contact with and tangent to said first drum to position in contact with and tangent to said second drum, and each of said band portions having a twist of 180 degrees therein, of: a device for sharpening a cutting edge of said continuous slicing band comprising a sharpener supporting shaft fixedly mounted on said base to be parallel to the axes of said drums, a sharpening frame mounted on said supporting shaft to have pivotal movement with respect to said shaft and sliding movement therealong, a pivot shaft extending longitudinally of said frame, at least two tool holding arms pivotally mounted on said pivot shaft, a separate sharpening tool mounted on an end of each of said tool holding arms spaced from said pivot shaft, a plurality of guide members all having guide slots therein, each of said guide slots having a first portion thereof lying in a common plane passing through the first portion of all of the other guide slots, said plane being perpendicular to the axes of said drums, said frame being movable from a first position clear of said continuous slicing band to a second position where a part of said first portion of said band will lie within said first portion of each of said guide slots of said guide members and at least one of said sharpening tools will be in adjacent relationship to each side of said sharpening band, sharpening tool spring means normally urging each of said sharpening tools in direction to contact said cutting edge of said continuous slicing band, a manipulating handle rotatably mounted in said frame, a tool cam operably associated with said manipulating handle and each of said tool holding arms to force the tool holding arms to move said sharpening tools in direction away from said cutting edge of said continuous slicing band against the action of said sharpening tool spring means when said manipulating handle is rotated in a first direction and to release the tool holding arms to the action of said tool spring means when said manipulating handle is rotated in a second direction.

11. The combination with a base, first and second parallel, spaced-apart drums rotatably mounted on said base, means for rotating said drums in opposite directions, and a continuous slicing band turning on and being fed between said first and second drums, said slicing band having a cutting edge and said slicing band having first and second portions thereof each extending from a position in contact with and tangent to said first drum to position in contact with and tangent to said second drum, and each of said band portions having a twist of 180 degrees therein, of: a device for sharpening a cutting edge of said continuous slicing band comprising a sharpener supporting shaft fixedly mounted on said base to be parallel to the axes of said drums, a sharpening frame mounted on said supporting shaft to have pivotal movement with respect to said shaft and sliding movement therealong, a pivot shaft extending longitudinally of said frame, at least two tool holding arms pivotally mounted on said pivot shaft, a separate sharpening tool mounted on an end of each of said tool holding arms spaced from said pivot shaft, a plurality of guide members all having guide slots therein, each of said guide slots having a first portion thereof lying in a common plane passing through the first portion of all of the other guide slots, said plane being perpendicular to the axes of said drums, a locating bar fixedly mounted with respect to said base to be parallel to said supporting shaft, a locating bracket integral with and extending outwardly from said sharpener frame, said sharpener frame being movable from a first position clear of said continuous slicing band and said locating bar to a second position wherein said locating bar will be in contact with and inside of said locating bracket, said continuous slicing band will be within said first portion of each of said guide slots and one of said sharpening tools will be located adjacent opposite sides of said cutting edge of said band, sharpening tool spring means normally urging each of said sharpening tools in direction to contact said cutting edge of said continuous slicing band, a manipulating handle rotatably mounted in said frame, a tool cam operably associated with said manipulating handle and each of said tool holding arms to force the tool holding arms to move said sharpening tools in direction away from said cutting edge of said continuous slicing band against the action of sharpening tool spring means when said manipulating handle is rotated in a first direction and to release the tool holding arms to the action of said tool spring means when said manipulating handle is rotated in a second direction.

12. The combination as specified in claim 7 wherein said sharpening tool is constituted as a grinding wheel rotatably mounted on said tool holding arm.

13. The combination with a base, first and second parallel, spaced-apart drums rotatably mounted on said base, means for rotating one of said drums, a continuous slicing band turning on and being fed between said first and second drums in a first direction, and said slicing band having a cutting edge, a back edge and parallel first and second side walls, of: a device for sharpening said cutting edge of said continuous slicing band comprising a sharpener frame, a grinding wheel rotatably mounted on said frame adjacent said first side wall, guide means following and preceding said grinding wheel in said first direction for holding said first side surface of said band in a common plane, said grinding wheel having a grinding surface lying in a grinding plane perpendicular to the axis of said grinding wheel and making a relatively small acute angle with a longitudinal section of said first side surface in said common plane and making a relatively small acute angle with a transverse section of said first side surface in the common plane, and resilient means for urging said grinding surface of said grinding wheel into contact with said cutting edge of said slicing band to have position so that said grinding surface plane will diverge outwardly from said longitudinal section of said first side surface in said common plane in direction opposite said first direction of movement of said slicing band and so that said grinding surface plane will diverge outwardly from said transverse section of said first side surface in said common plane in direction toward said back edge of said band.

(References on following page)

References Cited in the file of this patent

UNITED STATES PATENTS

| | | | |
|---|---|---|---|
| 284,957 | Furlong et al. | Sept. 11, | 1883 |
| 744,002 | Belle | Nov. 10, | 1903 |
| 1,104,592 | Whitcomb | July 21, | 1914 |
| 1,199,836 | Sweet | Oct. 3, | 1916 |
| 2,229,918 | Criner | Jan. 28, | 1941 |
| 2,537,512 | Crissey | Jan. 9, | 1951 |
| 2,621,454 | Callahan | Dec. 16, | 1952 |
| 2,725,698 | Hill | Dec. 6, | 1955 |

FOREIGN PATENTS

| | | | |
|---|---|---|---|
| 457,379 | Great Britain | Nov. 26, | 1936 |